United States Patent
Melvin et al.

(10) Patent No.: US 8,463,025 B2
(45) Date of Patent: Jun. 11, 2013

(54) DISTRIBUTED ARTIFICIAL INTELLIGENCE SERVICES ON A CELL PHONE

(75) Inventors: Iain Melvin, Rocky Hill, NJ (US); Koray Kavukcuoglu, Princeton, NJ (US); Akshat Aranya, Jersey City, NJ (US); Bing Bai, Princeton Junction, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 233 days.

(21) Appl. No.: 13/094,284

(22) Filed: Apr. 26, 2011

(65) Prior Publication Data

US 2012/0275690 A1    Nov. 1, 2012

(51) Int. Cl.
G06F 7/00 (2006.01)
G06E 1/00 (2006.01)

(52) U.S. Cl.
USPC ................................ 382/156; 701/59; 706/15

(58) Field of Classification Search
None
See application file for complete search history.

(56) References Cited

U.S. PATENT DOCUMENTS

| | | | |
|---|---|---|---|
| 2005/0143136 A1* | 6/2005 | Lev et al. | 455/566 |
| 2011/0082728 A1* | 4/2011 | Melikian | 705/14.13 |
| 2012/0011119 A1* | 1/2012 | Baheti et al. | 707/737 |

OTHER PUBLICATIONS

NPL—Jarrett et al. "What is the Best Multi-Stage Architecture for Object Recognition?", published 2009, IEEE.*
Lawrence, Y. et al., "Face Recognition: A Convolutional Neural Network Approach", IEEE Transactions on Neural Networks, vol. 8, Issue 1, Jan. 1997, pp. 98-113.
Lecun, Y. et al., "Backpropagation Applied to Handwritten Zip Code Recognition", Neural Computation, vol. 1, No. 4, Sep. 1989, pp. 541-551.
Lecun, Y. et al., "Gradient-Based Learning Applied to Document Recognition", Proceedings of the IEEE, vol. 86, No. 11, Nov. 1998, pp. 2278-2324.
Viola, P. et al., "Robust Real-Time Object Detection", Second International Workshop on Statistical and Computational Theories of Vision—Modeling, Learning, Computing, and Sampling, Jul. 2001, pp. 1-25.

* cited by examiner

*Primary Examiner* — Chan S Park
*Assistant Examiner* — Ha Le
(74) *Attorney, Agent, or Firm* — James Bitetto; Joseph Kolodka

(57) ABSTRACT

A cell phone having distributed artificial intelligence services is provided. The cell phone includes a neural network for performing a first pass of object recognition on an image to identify objects of interest therein based on one or more criterion. The cell phone also includes a patch generator for deriving patches from the objects of interest. Each of the patches includes a portion of a respective one of the objects of interest. The cell phone additionally includes a transmitter for transmitting the patches to a server for further processing in place of an entirety of the image to reduce network traffic.

18 Claims, 3 Drawing Sheets

DISTRIBUTED ARTIFICIAL INTELLIGENCE SERVICES ON A CELL PHONE

BACKGROUND

1. Technical Field

The present invention relates to mobile devices, and more particularly to distributed artificial intelligence services on a cell phone.

2. Description of the Related Art

Mobile device development has been driven by more and more sophisticated needs. Many of these potential applications, such as object/text recognition, speech recognition, semantic analysis and machine translation, depend heavily on machine intelligence, which is often achieved by machine learning techniques.

Unfortunately, many machine learning algorithms have large computing or storage requirements which make them less tractable for mobile devices. A straightforward idea is to gather data on the device and send the data to powerful servers for processing.

Thus, in most cases, the user selects an application appropriate for processing the kind of input data they will provide. Then the complete input data is sent by that application to a predetermined server for processing. In most cases, a static image is taken from the camera and the whole image is sent to the server for processing.

For example, a Bar Code application will process whole input images that include bar codes and send the result off for analysis by a server. For an object identification application, a complete image may be taken by the camera and sent to a server for analysis.

However, the network bandwidth could be a bottleneck in such scenarios. Hence, a good workload balance scheme between the handheld devices and the servers in the cloud will be very valuable.

SUMMARY

These and other drawbacks and disadvantages of the prior art are addressed by the present principles, which are directed to distributed artificial intelligence services on a cell phone.

According to an aspect of the present principles, a cell phone having distributed artificial intelligence services is provided. The cell phone includes a neural network for performing a first pass of object recognition on an image to identify objects of interest therein based on one or more criterion. The cell phone also includes a patch generator for deriving patches from the objects of interest. Each of the patches includes a portion of a respective one of the objects of interest. The cell phone additionally includes a transmitter for transmitting the patches to a server for further processing in place of an entirety of the image to reduce network traffic.

According to another aspect of the present principles, a method for providing a cell phone with distributed artificial intelligence services is provided. The method includes performing a first pass of object recognition on an image using a neural network to identify objects of interest therein based on one or more criterion. The method also includes deriving patches from the objects of interest. Each of the patches includes a portion of a respective one of the objects of interest. The method additionally includes transmitting the patches to a server for further processing in place of an entirety of the image to reduce network traffic.

According to yet another aspect of the present principles, a method is provided. The method is performed in a server and is for providing distributed artificial intelligence services to a cell phone. The method includes receiving, from the cell phone, patches derived from already identified objects of interest in an image. The method also includes performing, using a neural network, a second pass of object recognition on the patches to confirm that such already identified objects of interest are properly classified as such based on one or more criterion. The method additionally includes performing further processing on only the patches corresponding to confirmed ones of the already identified objects of interest. The method further includes transmitting the further processed versions of the patches to the cell phone for display to a user.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
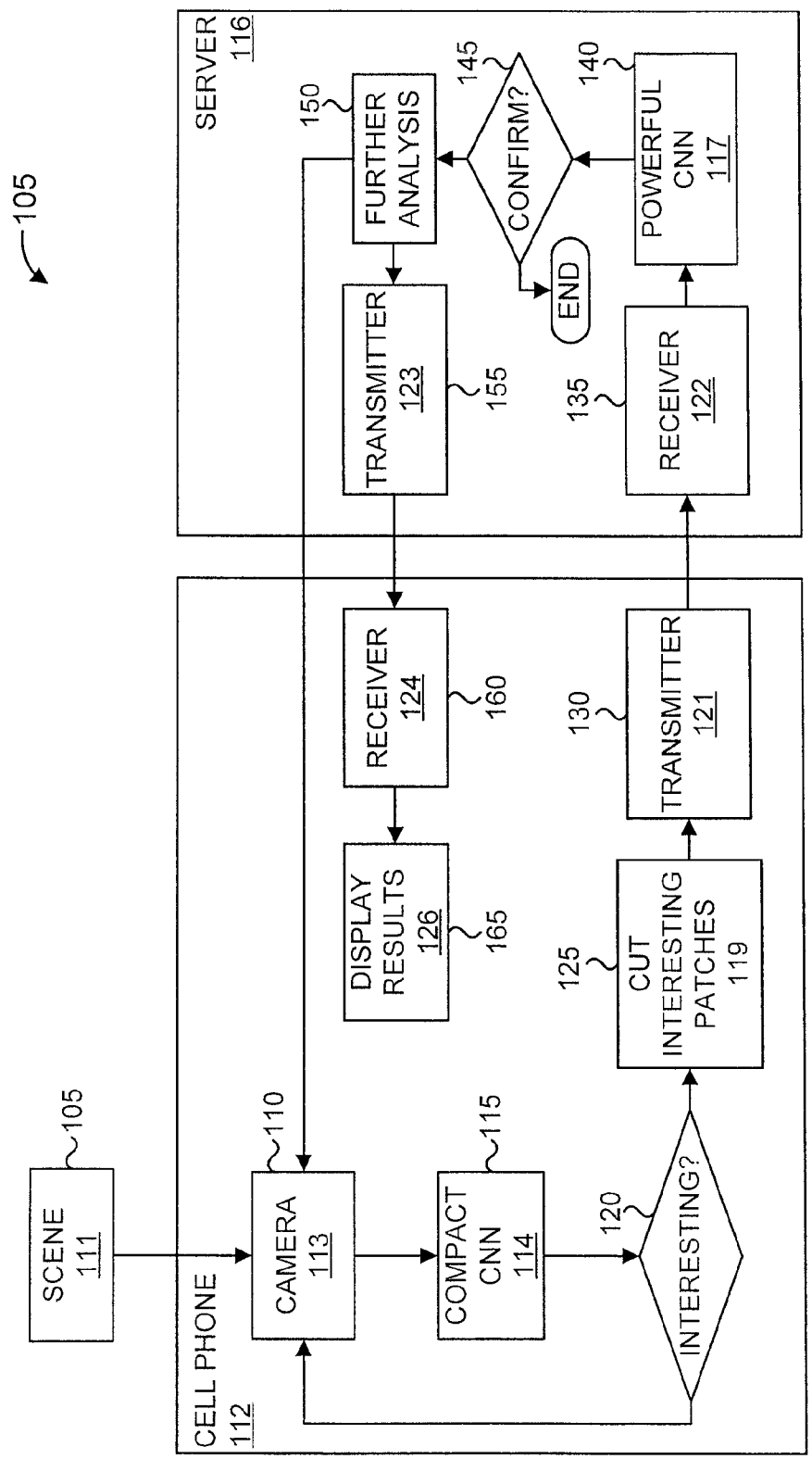
FIG. 1 is a high-level block diagram illustrating a method/system for providing distributed artificial intelligence services on a cell phone, according to an embodiment of the present principles.

Referring now in detail to the figures in which like numerals represent the same or similar elements and initially to FIG. 1, a high-level block diagram illustrating an exemplary method/system 100 for providing distributed artificial intelligence services on a cell phone according to an embodiment of the present principles is shown. At step 105, a scene 111 (e.g., relating to a video sequence) is provided. At step 110, a camera 113 (in a cell phone 112) captures video content relating to the scene 111, samples the frames of the scene 111 and sends the samples to a compact convolutional neural network (CNN) 114. At step 115, the compact CNN 114 processes the samples. At step 120, it is determined whether or not the compact CNN 114 finds any interesting objects in the (samples of the) image. If so, then the method/system 100 proceeds to step 125. Otherwise, the method/system 100 returns to step 110. At step 125, patches are cut and/or otherwise derived from the interesting objects by a patch generator 119. At step 130, the patches are transmitted by a transmitter 121 in the cell phone 112. At step 135, the patches are received by a receiver 122 in the server 116. At step 140, the patches are passed to a larger and more powerful CNN 117 (relative to compact CNN 114 in the cell phone 112) which processes the patches for more precise results. At step 145, it is confirmed, for each of the patches, whether or not a given patch is of interest. If so, then the method/system 100 proceeds to step 150. Otherwise, the method/system 100 is terminated. At step 150, the patches confirmed to be of interest (at step 145) are subjected to further analysis. At step 155, the results of the further analysis are transmitted by a transmitter 123 in the server 116. At step 160, the results of the further analysis are received by a receiver 124 in the cell phone 112.

At step 165, the results of the further analysis are displayed on a display device 126 disposed on the cell phone 112.

Regarding step 150, it is to be appreciated that step 150 may involve choosing an appropriate service to process the data after the further (detailed) analysis has been performed (in embodiments where default services are not set, but rather services are dynamically determined based on one or more criterion including, but not limited to, the type of content (e.g., face versus text, and so forth). For example, for text, an appropriate service may include an optical character recognition (OCR) service. Such OCR service may involve, for example, one or more of the following services: create a memo; send an e-mail that includes the text; and so forth. For an image, an appropriate service may include a face recognition service. The face recognition service may involve, for example, one or more of the following services: facial identity recognition; age analysis; and so forth. Also, step 150 may involve choosing the number of layers and other CNN related parameters used to perform the further analysis in the first place (in embodiments where default CNN related parameters are not set, but rather CNN related parameters are dynamically determined based on one or more criterion including, but not limited to, the type of content (e.g., face versus text, and so forth).

To that end, we note that one or more embodiments of the present principles are directed to providing "environment aware" cell phone applications. That is, the present principles are directed to providing applications that deliver specialized services to the user depending on, for example, environmental content. As an example, we focus on interpreting images from a camera. If the camera is pointing at a person, then we want the system to augment our experience by giving us information about that person in the view finder. If the camera is pointing at text, then we would like the system to perform optical character recognition (OCR) on that text to provide results on the cell phone. In one or more embodiments, we would like the system to determine which service to provide with no user interaction. Thus, the CNN 114 and/or the CNN 117 can be directed to facilitating the use of such environment aware applications.

Further regarding CNN 114 and CNN 117, we note that a convolutional neural network is a specialized neural network designed to detect patterns in images. A typical convolutional neural network includes a plurality of layers. The first several layers involve interleaving "convolutions" and "subsampling". Convolutional layers include a number of "kernels", which are usually filters with a fixed size (e.g., but not limited to 5×5). These filters are applied to every sub-window with the same size in the input plane, and generate a "convoluted" output. Subsampling reduces the size of convoluted planes by taking the average of the maximum of the sub-windows with a fixed size (e.g., but not limited to 2×2). Each convolution-subsampling pair generates a certain level of features. After training with backpropagation, the kernels will usually include patterns useful for the intended task. For example, a CNN learns strokes for digit recognition and learns gabor filters for object recognition. The CNN is one of the few deep neural networks that works well. However, the number of filters (kernels) increases as the recognition tasks become more complicated.

Regarding CNN 114, we note that the same is preferably made compact in order to run efficiently on a device of somewhat limited resources such as a cell phone. In an embodiment, the CNN 114 disposed at the cell phone 114 sacrifices a small degree of accuracy, which can be made up by a higher degree of accuracy at the server 116, since the CNN 117 at the server 116 is larger and more powerful than the CNN 114 at the cell phone 112.

Figure 2:
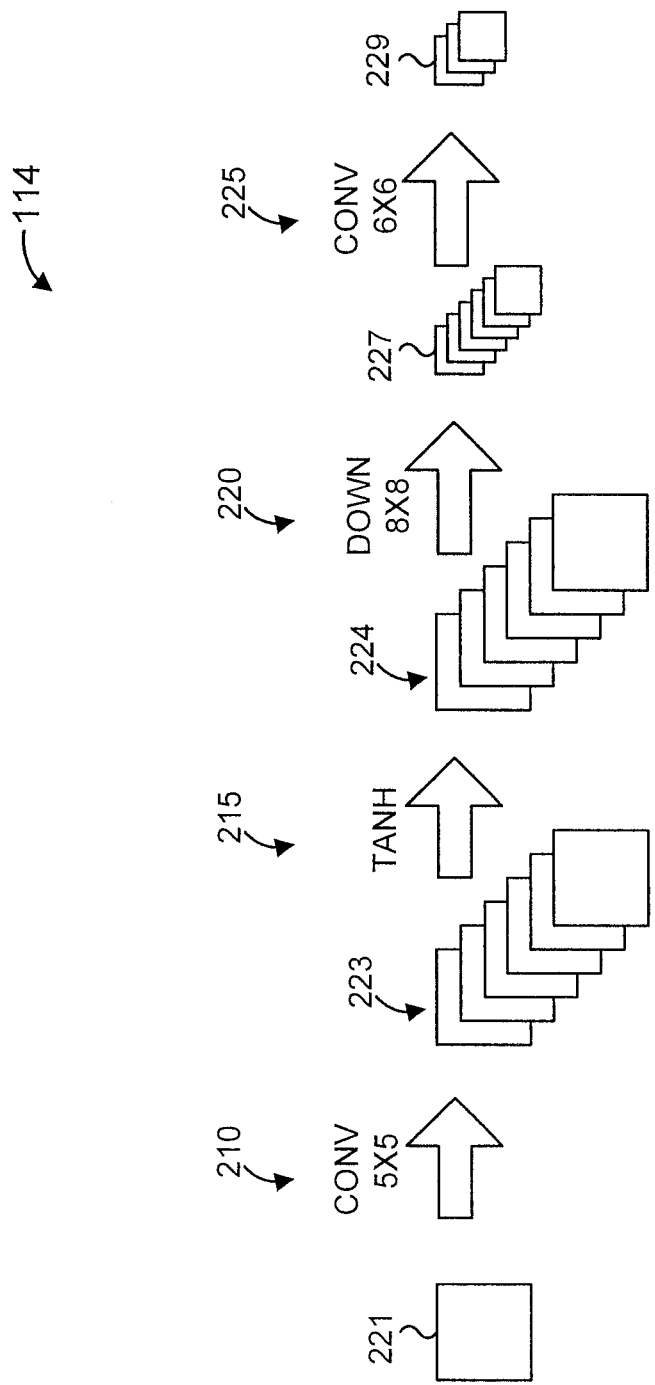
FIG. 2 is a high-level block diagram further showing the compact convolutional neural network (CNN) 114 of FIG. 1, according to an embodiment of the present principles.

FIG. 2 is a high-level block diagram further showing the compact convolutional neural network (CNN) 114 of FIG. 1, according to an embodiment of the present principles. At step 205, an image 221 of size a×b is provided. At step 210, the image 221 is convoluted by a small number n (e.g., n=6, noting that n can be smaller or larger, e.g., n may increase with increasing device capacity) of k×k (e.g., k=5, noting that k is not limited to 5, and thus other values of k may also be used) trainable kernels, to generate n planes of feature images ((a−4)×(b−4)) (collectively designated by the figure reference number 223). At step 215, a function y=abs(tanh(x)) is applied on every element the n planes of feature images 223, to generate new feature planes 224. At step 220, a downsize function is applied to the new feature planes 224, taking the average of large kernel windows at a large step size (e.g., 8×8 at a step size of 4, noting that other sizes can be used), to generate a set of smaller planes (in our case n planes having a size of 6×6) (collectively designated by the figure reference number 227). At step 225, n×M convolutions of the size of the images relating to smaller planes 227 (in our case 6 kernels having a size of 6×6) are applied to the smaller planes 227, where M is the number of classes of interest, to produce a final set of M output values 229 (in our case M=3, one for each of our classes of interest "face", "text" or "junk"). The predicted class is taken as the maximum of these outputs. Of course, it is to be appreciated that other values of M can be used, depending on the number of classes desired for a particular implementation of the present principles.

Moreover, we note in general that it is to be further appreciated that all of the specific values mentioned with respect to FIG. 2 are provided for illustrative purposes and, thus, other values may be used as readily contemplated by one of ordinary skill in the art, given the teachings of the present principles provided herein, while maintaining the spirit of the present principles.

Further, we note that in other embodiments, one of more the steps shown and described with respect to FIG. 2 may be omitted and/or modified, depending upon the implementation. For example, considerations such as accuracy, efficiency, and so forth may be used when determining the steps to be performed by the CNN 114 in order to provide adequate preliminary results for the object of interest evaluation.

We note that the cell phone cannot afford to perform too much computation, as the same will cause both large latency and excessive power consumption. We thus use the "mini" convolutional neural network structure represented by FIG. 2. CNN 114 has only one convolutional layer with 16 5×5 kernels and one down sampling layer to map 8×8 patches to 4×4 patches. The down sampling can be conducted by taking either average or maximum of the patch, which are referred to as "Average Pooling" and "Max Pooling", respectively. In between the convolutional and downsampling layers we use a Tanh function to introduce nonlinearity, then an ABS( ) function to take absolute values.

Both face detection and text detection are conducted by the same network. The last layer outputs the decision whether the input is, for example, a face, a piece of text, or neither (i.e., junk).

Based on the output of the CNN 114, we decide whether to pass the patch to server for more precise judgment. In an embodiment, we trade high precision for high recall at this stage. In other words, we prefer more false positives than more negatives, to avoid dropping useful information at this early stage.

Figure 3:
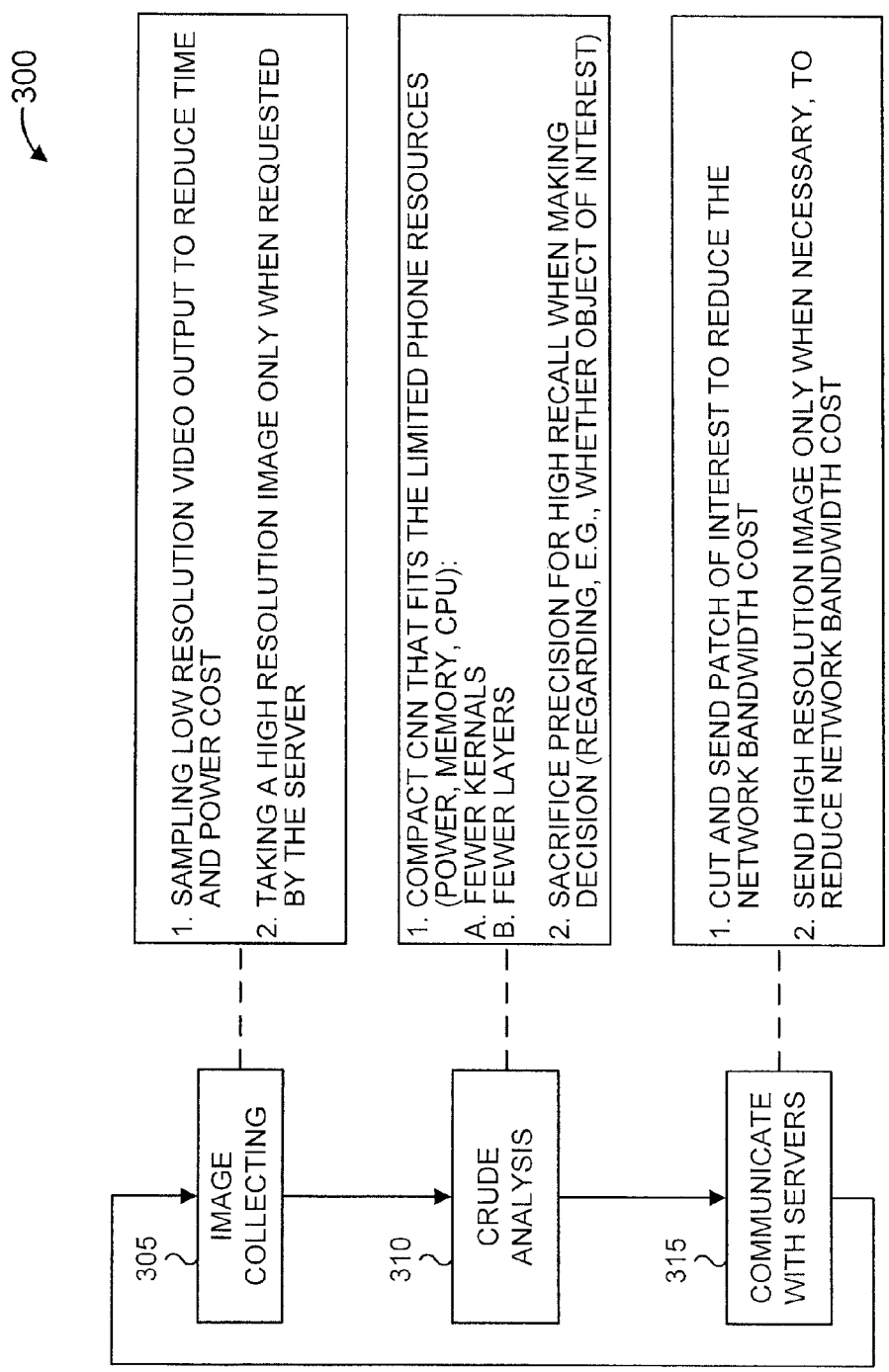
FIG. 3 is a flow diagram showing a method for providing distributed artificial intelligence services on a cell phone, according to an embodiment of the present principles.

FIG. 3 is a flow diagram showing a method 300 for providing distributed artificial intelligence services on a cell phone, according to an embodiment of the present principles. At step 305, image collecting is performed (e.g., by camera 113). As an example, step 305 may involve sampling a low resolution video output to reduce a time and power cost associated with processing the video output. Moreover, step 305 may involve taking a high resolution image(s) only when the server requests the high resolution image(s).

At step 310, a crude analysis of the image samples is performed by compact CNN 114. As an example, step 310 may involve a compact CNN that fits the limited phone resources (power, memory, CPU), such as having fewer kernels and/or fewer layers with respect to a larger CNN used thereafter). Moreover, step 310 may involve sacrificing precision for high recall when making a decision. Further, in some embodiments, step 310 may also be considered to include the further analysis performed by CNN 117.

At step 315, the cell phone communicates with the servers. As an example, step 315 may involve cutting and sending a patch of interest to the servers to reduce the network bandwidth cost. Moreover, step 315 may involve sending high-resolution images only when necessary, to reduce the network bandwidth cost.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Thus, referring back to FIG. 1, we have developed a distributed intelligent service method/system having an architecture that can efficiently leverage the processing capability of a mobile client to reduce the network traffic and processing required on the server. We focus on processing images from the camera input at interactive rates.

On the client end (e.g., cell phone 110), we integrate a small artificial intelligence agent (e.g., compact CNN 114) that can efficiently locate areas of interest. Uninteresting scenes or areas are immediately dropped without being sent to the server (e.g., 116) for further analysis. The more powerful CNN 117 at the server end performs a more accurate analysis on data sent by the client end, and selects further services/actions based on the determined content. The CNN at the server end can handle complicated pattern recognition quests.

The CNN at the cell phone parses coarse video input frames to find human faces, a text area, and so forth. If a face or some text is found, the patch is sent to the server for confirmation. The more powerful CNN at the server can provide a more confident judgment (since it is more complex than the CNN on the cell phone and thus requires more computing power). If the patch is confirmed as a "face", the patch is sent to, for example, an "Age Gender" application to detect the age and gender corresponding to the face. On the other hand, if it is confirmed to be text, a high resolution image is requested and taken by the camera, and is then sent to an optical character recognition (OCR) engine on the server. The results are passed back to the cell phone and displayed, for example, on an overlay.

This method/system optimally manages the limited computing power and bandwidth of the smart phone to reduce the power consumption and service latency and provides a rich application experience to the user. As the processing power of smart phones increases, these advantages will be further highlighted and make more intelligent services possible.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A cell phone having distributed artificial intelligence services, comprising:
   a neural network for performing a first pass of object recognition on an image to identify objects of interest therein based on one or more criterion
   a patch generator for deriving patches from the objects of interest, each of the patches comprising a portion of a respective one of the objects of interest; and
   a transmitter for transmitting the patches to a server for further processing in place of an entirety of the image to reduce network traffic; and wherein
   the neural network performs the first pass by convoluting the image with a particular number n of trainable kernels to generate a plurality of planes of feature images, downsizing the plurality of planes of feature images to obtained a plurality of downsized planes of feature images, convoluting the plurality of downsized planes using n×M convolutions of a size of the images corresponding to the plurality of planes of features images to produce a final set of M output values, wherein M is a number of classes of interest, and a maximum one of the M output values is selected as a predicted class for the image.

2. The cell phone of claim 1, wherein the neural network is adapted to local resources present on the cell phone.

3. The cell phone of claim 1, wherein the cell phone comprises a camera for capturing images, a default image capture resolution of the camera is set to a low resolution, and high resolution images are only captured by the camera when requested by the server.

4. The cell phone of claim 1, wherein the neural network is at least one of selected and configured to have at least one of less kernels and less layers than a corresponding neural network used by the server for the further processing.

5. The cell phone of claim 1, wherein the classes of interest comprise at least a face class and a text class.

6. The cell phone of claim 1, further comprising applying a function to every pixel in the plurality of planes of feature images to generate a plurality of transformed planes of feature images, wherein the plurality of planes of feature images that are downsized are the plurality of transformed planes of feature images.

7. The cell phone of claim 1, further comprising a receiver for receiving further processed versions of the patches from the server.

8. A method for providing a cell phone with distributed artificial intelligence services, comprising:
   performing a first pass of object recognition on an image using a neural network to identify objects of interest therein by:
      convoluting the image with a particular number n of trainable kernels to generate a plurality of planes of feature images;
      downsizing the plurality of planes of feature images to obtained a plurality of downsized planes of feature images; and
      convoluting the plurality of downsized planes using n×M convolutions of a size of the images corresponding to the plurality of planes of features images to produce a final set of M output values, wherein M is a number of classes of interest, and a maximum one of the M output values is selected as a predicted class for the image;
   deriving patches from the objects of interest, each of the patches comprising a portion of a respective one of the objects of interest; and
   transmitting the patches to a server for further processing in place of an entirety of the image to reduce network traffic.

9. The method of claim 8, wherein the neural network is adapted to resources present on the cell phone.

10. The method of claim 8, wherein the cell phone comprises a camera, and the method further comprises setting a default image capture resolution of the camera to a low resolution, and permitting capture of high resolution images by the camera only when requested by the server.

11. The method of claim 8, further comprising at least one of selecting and configuring the neural network to have at least one of less kernels and less layers than a corresponding neural network used by the server for the further processing.

12. The method of claim 8, wherein the classes of interest comprise at least a face class and a text class.

13. The method of claim 8, further comprising applying a function to every pixel in the plurality of planes of feature images to generate a plurality of transformed planes of feature images, wherein the plurality of planes of feature images that are downsized are the plurality of transformed planes of feature images.

14. The method of claim 8, further comprising receiving further processed versions of the patches from the server.

15. A method in a server for providing distributed artificial intelligence services to a cell phone, comprising:
   receiving, from the cell phone, patches derived from already identified objects of interest in an image; and
   wherein the cell phone performing a first pass of object recognition on an image using a neural network to identify objects of interest therein based on one or more criterion by:
      convoluting the image with a particular number n of trainable kernels to generate a plurality of planes of feature images;
      downsizing the plurality of planes of feature images to obtained a plurality of downsized planes of feature images; and
      convoluting the plurality of downsized planes using n×M convolutions of a size of the images corresponding to the plurality of planes of features images to produce a final set of M output values, wherein M is a number of classes of interest, and a maximum one of the M output values is selected as a predicted class for the image; and
   performing, using a neural network a second pass of object recognition on the patches to confirm that such already identified objects of interest are properly classified as such based on one or more criterion;
   deriving patches from the objects of interest, each of the patches comprising a portion of a respective one of the objects of interest; and
   transmitting the patches to a server for further processing in place of an entirety of the image to reduce network traffic;
   performing further processing on only the patches corresponding to confirmed ones of the already identified objects of interest; and
   transmitting the further processed versions of the patches to the cell phone for display to a user.

16. The method of claim 15, further comprising discarding the patches corresponding to non-confirmed ones of the already identified objects of interest.

17. The method of claim 15, further comprising at least one of selecting and configuring the neural network to have at least one of more kernels and more layers than a corresponding neural network used by the cell phone to perform initial object of interest identification.

18. The method of claim 15, further comprising at least one of selecting and configuring the neural network to have a greater accuracy than a corresponding neural network used by the cell phone to perform initial object of interest identification.

* * * * *